US010269050B1

United States Patent
Ohnstad et al.

(10) Patent No.: US 10,269,050 B1
(45) Date of Patent: Apr. 23, 2019

(54) METHOD AND SYSTEM FOR USER-CONTROLLED INVOICE DISTRIBUTION

(71) Applicant: Sentry Insurance a Mutual Company, Stevens Point, WI (US)

(72) Inventors: Elizabeth Ohnstad, Stevens Point, WI (US); Kevin O'Toole, Stevens Point, WI (US); Debra Kozelek, Stevens Point, WI (US)

(73) Assignee: SENTRY INSURANCE A MUTUAL COMPANY, Stevens Point, WI (US)

( * ) Notice: Subject to any disclaimer, the term of this patent is extended or adjusted under 35 U.S.C. 154(b) by 287 days.

(21) Appl. No.: 14/713,990

(22) Filed: May 15, 2015

(51) Int. Cl.
*G06Q 30/04* (2012.01)
*G06Q 40/08* (2012.01)
*G06Q 30/00* (2012.01)
*G06Q 50/00* (2012.01)
*G06Q 40/00* (2012.01)

(52) U.S. Cl.
CPC ............. *G06Q 30/04* (2013.01); *G06Q 40/08* (2013.01)

(58) Field of Classification Search
None
See application file for complete search history.

(56) References Cited

U.S. PATENT DOCUMENTS

| 6,125,354 | A | * | 9/2000 | MacFarlane et al. | ........... 705/34 |
| 7,885,835 | B2 | * | 2/2011 | Amigo | ................... G06Q 40/02 |
| | | | | | 705/4 |
| 2002/0107792 | A1 | * | 8/2002 | Anderson | .............. G06Q 10/10 |
| | | | | | 705/40 |
| 2003/0033173 | A1 | * | 2/2003 | Suzuki | ................... G06Q 40/02 |
| | | | | | 705/4 |
| 2007/0265962 | A1 | * | 11/2007 | Bowe, Jr. | ............. G06Q 20/102 |
| | | | | | 705/40 |
| 2009/0043650 | A1 | * | 2/2009 | Abhyanker | ............ G06Q 10/10 |
| | | | | | 705/14.39 |
| 2012/0066005 | A1 | * | 3/2012 | Stewart | .............. G06Q 30/0282 |
| | | | | | 705/4 |
| 2013/0073318 | A1 | * | 3/2013 | Feldman | ................ G06Q 40/08 |
| | | | | | 705/4 |
| 2014/0156508 | A1 | * | 6/2014 | Argue | .................... G06Q 20/32 |
| | | | | | 705/39 |
| 2014/0172465 | A1 | * | 6/2014 | Yoder | .................... G06Q 40/08 |
| | | | | | 705/4 |
| 2014/0365246 | A1 | * | 12/2014 | Hayward | ............... G06Q 40/08 |
| | | | | | 705/4 |

* cited by examiner

*Primary Examiner* — Ariel J Yu
(74) *Attorney, Agent, or Firm* — Foley & Lardner LLP

(57) ABSTRACT

A method includes receiving, from a computing device of a customer, a request that specifies allocation of an insurance premium to a plurality of locations of the customer. The method includes generating, in response to the request and by an invoice distribution server, one or more rules to implement the request. The method also includes receiving, by the invoice distribution system, an amount of the insurance premium. The method also includes executing the one or more rules to allocate the insurance premium to the plurality of locations of the customer in accordance with the request. The method further includes generating a plurality of invoices indicative of the allocation of the insurance premium.

21 Claims, 4 Drawing Sheets

| Coverage A: | Loc. 1 | % | Loc. 2 | % | Loc. 3 | % | Loc. 4 | % |
|---|---|---|---|---|---|---|---|---|
| Coverage B: | Loc. 1 | % | Loc. 2 | % | Loc. 3 | % | Loc. 4 | % |
| Coverage C: | Loc. 1 | % | Loc. 2 | % | Loc. 3 | % | Loc. 4 | % |
| Coverage D: | Loc. 1 | % | Loc. 2 | % | Loc. 3 | % | | |
| Coverage E: | Loc. 1 | % | Loc. 2 | % | | | | |

SUBMIT

METHOD AND SYSTEM FOR USER-CONTROLLED INVOICE DISTRIBUTION

BACKGROUND

Insurance is used by both commercial entities and individuals as a way to help cover damages, losses, etc. that occur from various events such as natural disasters, injuries, accidents, vandalism, and so on. There are many different types of insurance coverage, including automobile insurance, home/building insurance, worker's compensation insurance, general liability insurance, umbrella policies, etc. It is often the case that a commercial entity will have multiple distinct locations or businesses that each require insurance coverage. For example, a metal working company may have several different shops located in several different cities. In such a scenario, it may be desirable for each individual shop to receive an insurance invoice that is specific to the individual shop, as opposed to a single invoice that applies to the entire chain of shops.

SUMMARY

An illustrative method includes receiving, from a computing device of a customer, a request that specifies allocation of an insurance premium to a plurality of locations of the customer. The method includes generating, in response to the request and by an invoice distribution server, one or more rules to implement the request. The method also includes receiving, by the invoice distribution system, an amount of the insurance premium. The method also includes executing the one or more rules to allocate the insurance premium to the plurality of locations of the customer in accordance with the request. The method further includes generating a plurality of invoices indicative of the allocation of the insurance premium.

An illustrative server includes a memory, a transceiver, and a processor operatively coupled to the memory and to the transceiver. The memory is configured to store a rules engine and information regarding a customer. The transceiver is configured to receive, from a computing device of the customer, a request that specifies allocation of an insurance premium of the customer to a plurality of locations of the customer. The transceiver is also configured to receive an amount of the insurance premium. The processor is configured to generate, in response to the request, one or more rules in the rules engine to implement the request. The processor is also configured to execute the one or more rules to allocate the insurance premium to the plurality of locations of the customer in accordance with the request. The processor is further configured generate a plurality of invoices indicative of the allocation of the insurance premium.

An illustrative non-transitory computer-readable medium includes instructions stored thereon, that upon execution by a processor of a computing device, cause the computing device to perform operations. The instructions include instructions to receive, from a computing device of a customer, a request that specifies allocation of an insurance premium to a plurality of locations of the customer. The instructions also include instructions to generate, in response to the request, one or more rules to implement the request. The instructions also include instructions to receive an amount of the insurance premium. The instructions also include instructions to execute the one or more rules to allocate the insurance premium to the plurality of locations of the customer in accordance with the request. The instructions further include instructions to generate a plurality of invoices indicative of the allocation of the insurance premium.

BRIEF DESCRIPTION OF THE DRAWINGS

Illustrative embodiments will hereafter be described with reference to the accompanying drawings.

FIG. 4 is a representation of a user interface for providing invoice split requests in accordance with an illustrative embodiment.

DETAILED DESCRIPTION

Figure 1:
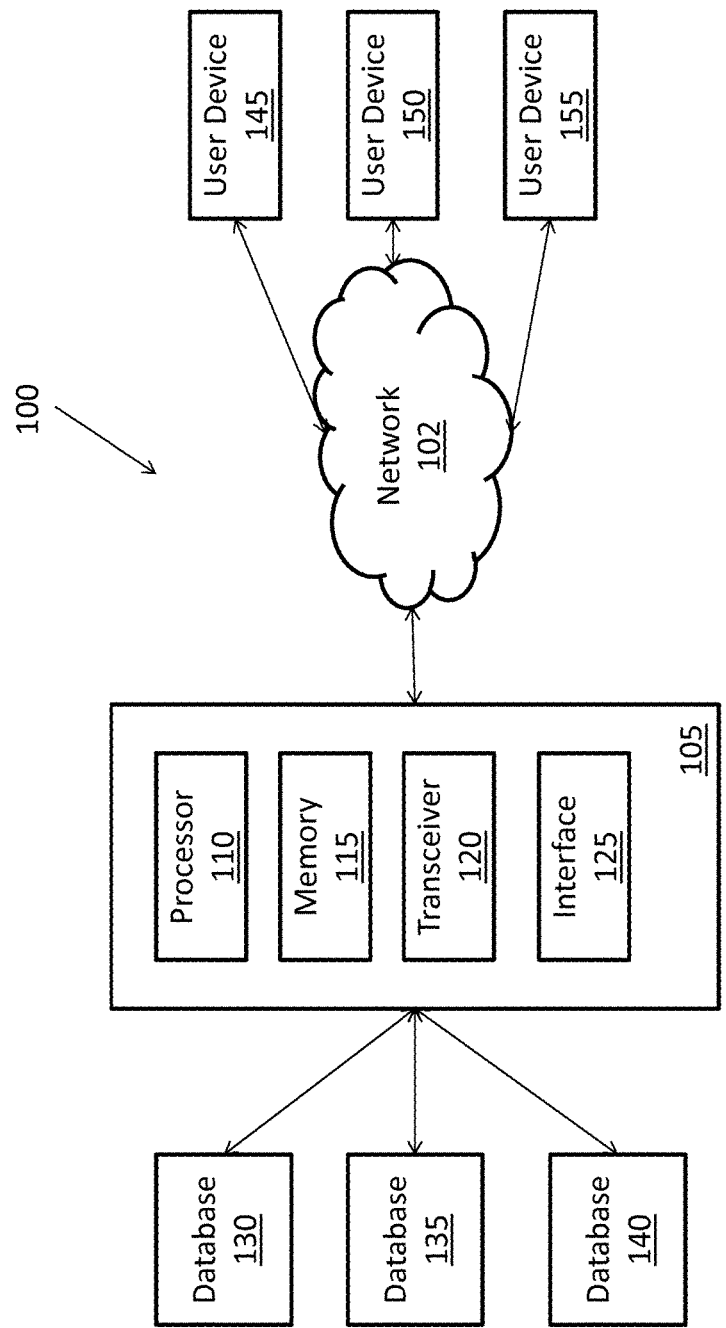
FIG. 1 is a block diagram depicting a system for user-controlled invoice distribution in accordance with an illustrative embodiment.

Described herein are illustrative embodiments for methods and systems that allow customers (or users) to specify in detail how invoices are to be split. Although the description herein is primarily in the context of the insurance industry, it is to be understood that the systems and methods described herein can be applied to other industries without limitation.

In one embodiment, a customer may have a specific type of insurance coverage that applies to multiple locations of the customer's business. For example, the customer may be a car dealer that has a chain of five car dealerships spread throughout five different cities. The customer may have, for example, a general liability insurance policy that provides general liability insurance for each of the five car dealerships. Since the general liability insurance policy applies to all five dealerships, the customer may desire to have each of the five dealerships be accountable for paying its respective portion of the insurance premium that is required to maintain the policy. In the past, one option would be for the customer to establish five different general liability insurance policies (i.e., one for each dealership) such that each dealership receives an appropriate invoice specific to that dealership. However, such an arrangement may not be ideal for the customer because cost savings that result from a combined policy may be lost, the customer is required to spend additional time setting up five separate policies, claims submission is more complicated, etc. Such a scenario is also problematic for the insurance company providing the policies. For example, setting up and maintaining five different insurance policies requires significantly more time and internal processing than does a single policy. The additional internal processing places a drain on the insurance company's technological resources and processing power, resulting in an overall slower and less efficient system.

The methods and systems described herein are intended to provide greater flexibility to customers and to reduce the overall internal processing demands and drain on technological resources of the insurance company. This reduction in processing demands results in cost savings for the insurance provider, which can be passed to customers. In an illustrative embodiment, customers are given complete control of how their invoices are split and the destinations to which the invoices are delivered. In one embodiment, the customer's interaction with the insurance company is entirely automated. Such automation significantly reduces the risk of errors that may result from manual entry and implementation of requests received from customers. In an alternative embodiment, the system may be partially automated such that customers provide invoice preferences through an automated interface. Upon receipt of the invoice preferences, employees of the insurance company may manually enter the preferences into a server to implement the desired changes. In another alternative embodiment, customer preferences may be received from customers through a phone call, in person meeting, e-mail, etc. Upon receipt of the preferences, employees of the insurance company can manually enter the changes using the functionality of the system described herein.

Continuing the example above in which the customer has five dealerships in five different locations, the customer may obtain a single general liability insurance policy that applies to all five dealerships. Upon establishment of the policy, the customer can be provided with access to an interface that allows the customer to request split billing through a network connection. In an illustrative embodiment, only specific employees of the customer may have access to the interface. The split billing request can be percentage based such that the customer can specify what portion of the overall general liability insurance premium should be assigned to each of the five dealerships. In one embodiment, the interface may include an option that allows the customer specify an equal division of premium among the customer's business locations. In this example, selection of such an option would result in 20% of the premium being billed to each of the five dealerships. The customer can also specify different percentage amounts for each business location. The customer can, for example, assign 50% of the premium to one of the dealerships and 12.5% of the invoice to each of the other four dealerships. Alternatively, the customer can assign 10% of the premium to the first dealership, 15% of the premium to the second dealership, 20% of the premium to the third dealership, 25% of the premium to the fourth dealership, and 30% of the premium to the fifth dealership.

In another embodiment, the customer can specify billing preferences based on the type of insurance coverage. For example, a customer may have three different types of insurance policies that cover a car dealership having four distinct locations. In accordance with the present system, the customer can specify that the first type of insurance coverage is to be billed entirely to a first car dealership location, that the second type of insurance coverage is to be billed entirely to a second car dealership location, and that the third type of insurance coverage is to be billed entirely to a third car dealership location. Alternatively, the customer may specify that the first type of insurance coverage is to be billed entirely to a first car dealership location, that the second type of insurance coverage is to be billed entirely to a second car dealership location, and that the third type of insurance coverage is to be split among the four dealership locations based on specified percentages to each of the four locations.

Turning now to the figures, FIG. 1 is a block diagram depicting a system 100 for user-controlled invoice distribution in accordance with an illustrative embodiment. System 100 includes a network 102, an invoice distribution server 105, databases 130-140, and user (or customer) devices 145-155. In alternative embodiments, system 100 may include additional, fewer, and/or different components. For example, while only three user devices are illustrated in FIG. 1, it is envisioned that numerous customers will have access to system 100. Similarly, invoice distribution server 105 may be in communication with fewer or additional databases, depending on the implementation.

In a representative embodiment, invoice distribution server 105 includes a processor 110, a memory 115, transceiver 120, and an interface 125. In alternative embodiments, invoice distribution server 105 may include fewer, additional, and/or different components. Processor 110 can be any type of computer processing device known to those of skill in the art. Similarly, memory 115 can be any type of computer memory or storage component known to those of skill in art. Transceiver 120 can be any type of communication device that allows invoice distribution server 105 to receive and transmit information through a network or direct connection. Interface 125 can be a portal through which customers (or alternatively employees of the insurance company) are able to access invoice distribution server 105 and enter preferences regarding invoice distribution. In one embodiment, interface 125 can also allow insurance company personnel to access invoice distribution server 105 for entry of customer preferences, monitoring, maintenance, coding, etc.

In another illustrative embodiment, memory 115 can be configured to store a rules engine that includes rules which implement the functionality of invoice distribution server 105. For example, the rules engine can implement rules to facilitate billing in accordance with received customer preferences. Processor 110 is configured to execute the rules engine. Memory 115 can also store customer information such as the types of insurance coverage for each customer, the physical location(s) of each customer, previously received billing preferences of the customer, etc.

Invoice distribution server 105 is in communication with user devices 145-155 through network 102. In an illustrative embodiment, network 102 can be a wide area network (WAN) such as the Internet. Alternatively, network 102 can be any other type of network known to those of skill in the art. User devices 145-155 can differ from one another, and may include desktop computers, laptop computers, tablets, smartphones, etc. Each of user devices 145-155 can include at least a processing component, a memory component, and a communication component that allows user devices 145-155 to access network 102 and communicate with invoice distribution server 105. User devices 145-155 can use network 102 to access interface 125 of invoice distribution server 105.

Invoice distribution server 105 is also in communication with databases 130-140. Databases 130-140 can be internal databases that are configured to determine premiums for customers and to provide the determined premiums to invoice distribution server 105. In alternative embodiments, databases 130-140 may be servers, policy administration systems, other types of computing devices, etc. Upon receipt of premium information from databases 130-140, invoice distribution server 105 can apply rules from the rules engine in accordance with each customer's preferences to implement billing. In one embodiment, each of database 130, database 135, and database 140 can correspond to a specific coverage type. For example, database 130 may be a general liability premium database that provides general liability premiums for all customers to invoice distribution sever 105. Similarly, database 135 may be an auto insurance premium database that provides automobile insurance premiums for all customers to invoice distribution server 105, and so on. In alternative embodiments, a single database or server may be used to provide premium information for all coverage types to invoice distribution server.

Figure 2:
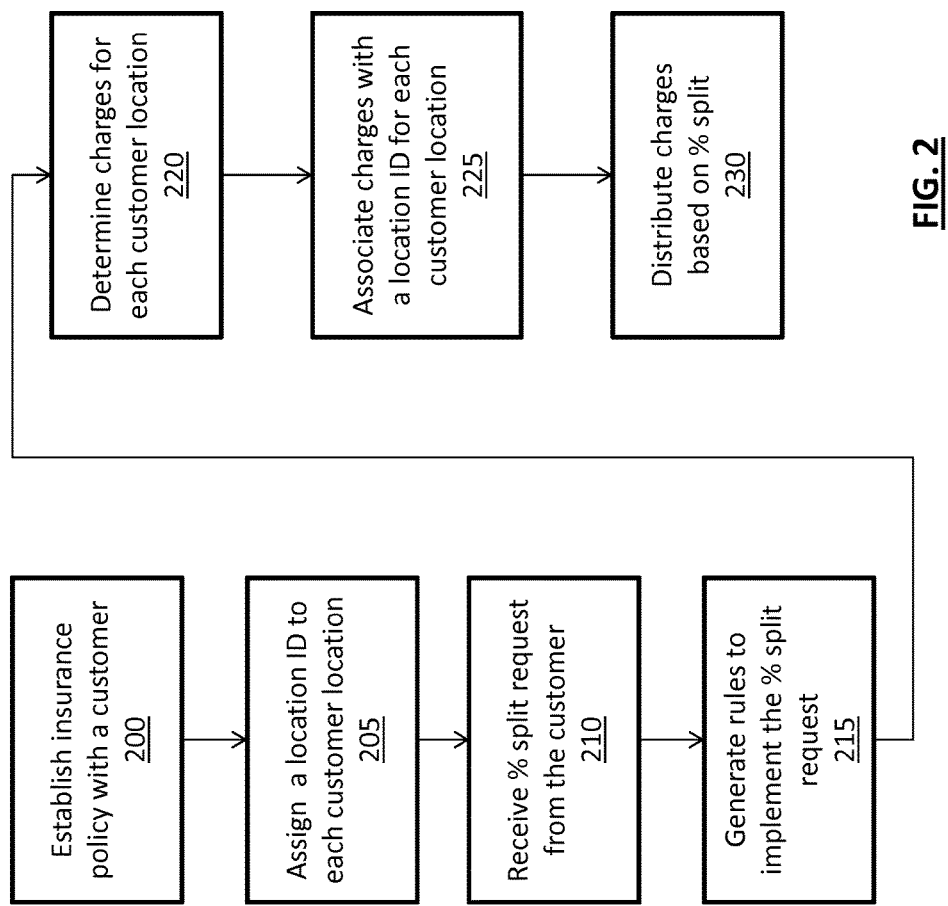
FIG. 2 is a flow diagram depicting a process for percentage based invoice splitting in accordance with an illustrative embodiment.

FIG. 2 is a flow diagram depicting a process for percentage based invoice splitting in accordance with an illustrative embodiment. In alternative embodiments, additional, fewer, and/or different operations may be performed. In addition, the order of operations as presented in the flow diagram is not intended to be limiting with respect to the order in which operations are actually performed. In an operation 200, an insurance policy is established with a customer. Among other things, establishment of the insurance policy involves collecting information from the customer regarding the types of insurance coverage desired, the number and address of the customer's locations to be covered by each type of insurance, contact information for the customer, etc. At least a portion of the information received from the customer during the policy establishment process can be stored in memory 115 of invoice distribution server 105.

In an operation 205, a location identifier (ID) is assigned to each customer location identified by the customer in operation 200. The location ID can be an address or any type of numeric, alphanumeric, symbolic, etc. identifier such that invoice distribution server 105 is able to distinguish between locations of the customer. The location IDs can be stored in memory 115. The location IDs can also be stored in databases 130-140 as discussed in more detail below.

In an operation 210, a percentage split request is received from the customer. The percentage split request can be received from a user device of the customer through interface 125 of invoice distribution server 105. In one embodiment, the percentage split request can specify what portion of the insurance premium is to be billed to each location of the customer. A percentage split request can be individually associated with each coverage type of the customer such that different coverage types can have different percentage splits. Alternatively, a premium can be evenly divided between a number of different customer locations.

In response to receipt of the percentage split request from the customer, rules are generated to implement the request in an operation 215. In one embodiment, processor 110 can execute a rules engine stored in memory 115 such that the rules engine generates the rules to implement the request. Once generated, the rules can be stored in memory 115 and associated with the customer and customer locations, as appropriate. In an operation 220, appropriate charges for each customer location are determined based on the rules stored in memory 115. In an operation 225, the charges are associated with the appropriate location ID for each customer location. In one embodiment, the premium information for each type of insurance coverage for a customer is provided to invoice distribution server 105 from databases 130-140. Upon receipt of the premium information, invoice distribution server 105 applies the generated, customer-specific rules to each premium type such that the proper allocations are made to each customer location.

In an operation 230, the charges are provided to the customer based on the specified percentage split. The charges can be provided in the form of invoices that are physically or electronically delivered to the customer. As an example, the customer may specify that 10% of the premium for Coverage A be attributed to a first location, that 20% of Coverage A be attributed to a second location, and that the remaining 70% of Coverage A be attributed to a third location. Assuming a premium amount of $10,000, the system would distribute an invoice in the amount of $1,000 to the first location, an invoice in the amount of $2,000 to the second location, and an invoice in the amount of $7,000 to the third location. The same procedure can be followed for each additional type of insurance coverage purchased by the customer.

As another example, the customer may have a corporate headquarters and three locations separate from the corporate headquarters. A given insurance policy may be for coverage that applies to the three locations, but that does not apply to the corporate headquarters. In such an embodiment, the customer may specify that all or a portion of the insurance premium be invoiced to the corporate headquarters even though the insurance policy does not actually cover the corporate headquarters.

Figure 3:
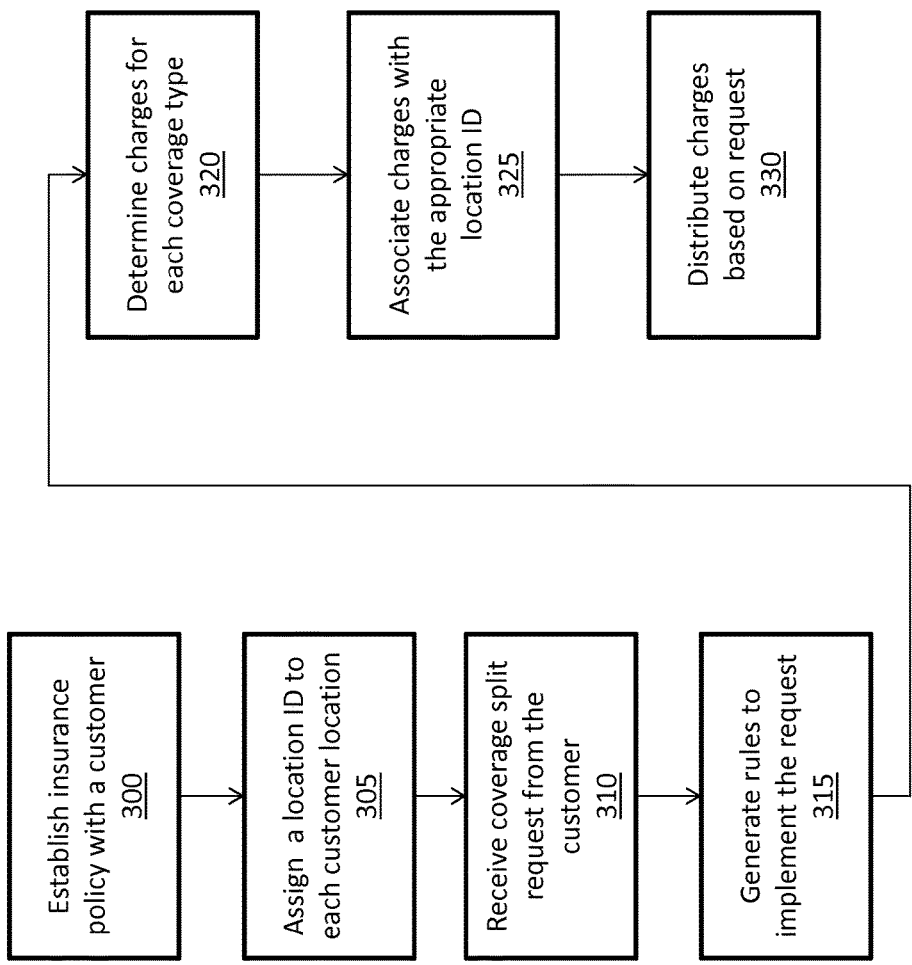
FIG. 3 is a flow diagram depicting a process for coverage based invoice splitting in accordance with an illustrative embodiment.

FIG. 3 is a flow diagram depicting a process for coverage based invoice splitting in accordance with an illustrative embodiment. In alternative embodiments, additional, fewer, and/or different operations may be performed. In addition, the order of operations as presented in the flow diagram is not intended to be limiting with respect to the order in which operations are actually performed. In an operation 300, an insurance policy is established with a customer. As discussed with reference to FIG. 2, establishment of the insurance policy involves collecting information from the customer regarding the types of insurance coverage desired, the number and address of the customer's locations to be covered by each type of insurance, contact information for the customer, etc. At least a portion of the information received from the customer during the policy establishment process can be stored in memory 115 of invoice distribution server 105.

In an operation 305, a location identifier (ID) is assigned to each customer location identified by the customer in operation 200. In an operation 310, a coverage split request is received from the customer. The coverage split request can specify which coverage types are to be billed to which of the customer locations. As just one example, the customer may specify that the premiums for coverage types A and B are to be invoiced to a first location, that the premium for coverage type C is to be invoiced to a second location, and that the premium for coverage type D is to be invoiced to a third location. In an illustrative embodiment, the coverage split request is received from a user device of the customer through interface 125 of invoice distribution server 105.

In response to receipt of the coverage split request from the customer, rules are generated to implement the request in an operation 315. As discussed with reference to FIG. 2, processor 110 can execute a rules engine stored in memory 115 such that the rules engine generates the rules to implement the request. Once generated, the rules can be stored in memory 115 and associated with the customer and customer locations, as appropriate. In an operation 320, appropriate charges for each customer location are determined based on the rules stored in memory 115. In an operation 325, the charges are associated with the appropriate location ID for each customer location. In one embodiment, the premium information for each type of insurance coverage for a customer is provided to invoice distribution server 105 from databases 130-140. Upon receipt of the premium information, invoice distribution server 105 applies the generated, customer-specific rules to each premium type such that the proper allocations are made to each customer location. In an operation 330, the charges are provided to the customer based on the specified coverage split.

In an alternative embodiment, the invoice split can be location based. In one implementation, the insurance company may associate a predetermined portion of an invoice with each of a number of physical locations. For example, the customer may have three car dealerships and an umbrella policy that covers all three of them. A default for the system may be to automatically attribute ⅓ of the total premium amount to each of the three dealerships. The customer can control the invoices in terms of the locations. For example, the customer can specify that any portions of the invoice attributable to the first physical location should be invoiced to a first destination, where the first destination can be the first physical location or a different location depending on customer preferences. Similarly, the customer can specify that any portions of the invoice attributable to the second physical location should be invoiced to a second destination, and so on. In an illustrative embodiment, each of the various types of invoice splitting (i.e, coverage based, percentage based, and location based) can be used in combination with one another, depending on the customer's preferences.

FIG. 4 is a representation of a user interface 400 for providing invoice split requests in accordance with an illustrative embodiment. It should be understood that user interface 400 is provided for illustrative purposes only, and that the actual appearance, format, etc. of the user interface may differ depending on the implementation. A customer can access user interface 400 using a user device, as discussed with reference to FIG. 1. As indicated in FIG. 4, the customer accessing user interface 400 has purchased five different types of insurance coverage (i.e., coverages A-E), and the customer has four different physical locations to which the insurance applies. Coverages A-C are applicable to all four locations of the customer, whereas coverage D applies to only locations 1-3, and coverage E applies to only locations 1 and 2. In an alternative embodiment, the user interface 400 may be accessed by employees of the insurance company to enter requests received from the customer.

The customer, upon accessing user interface 400, can specify the percentage split of each coverage type for each of the customer's locations. Upon hitting the SUBMIT button, the customer request is provided to invoice distribution server 105 for processing and rule generation. In one embodiment, a different user interfaces can be made available to the customer for requesting coverage splits. Alternatively, the customer can use user interface 400 to request coverage splits by indicating that 100% of the premium for a given type of coverage is to be invoiced to a specific location, and 0% of the premium for that coverage type is to be invoiced to the other locations. In an illustrative embodiment, invoice distribution server 105 can generate an error message and provide it to the user in the event that the total of the specified percentages for a given coverage type does not add up to 100%.

In one embodiment, the customer can specify requests that are to be implemented at a future date. For example, the customer may indicate that a specific percentage split or coverage request go into effect on Date X, which is a date that may be days, weeks, or months in the future. When Date X arrives, invoice distribution server 105 can implement a rule or rules to enable the client request from that point in time going forward. In another embodiment, the customer may be able to specify one time requests that apply only to a next (or subsequent) invoice. The one time requests can be specific to each coverage type such that some coverage types may be affected by the one-time request, and other coverage types may not. Similarly, the customer may specify a date range over which a request is to be in effect, where the date range can also be individually specified for each coverage type. The specified date range can have a start date of the current date or a start date that is in the future. During the specified date range, invoice distribution server 105 will implement the specified split requests. When the specified date range ends due to passing of a specified end date of the range, the premium processing for the customer can revert back to whatever state it was in prior to implementation of the date range request. In yet another embodiment, the customer can access the system to view rules (i.e., preferences) that are currently in place, past rules that were in place for the customer, dates during which current and/or past rules have been in place, upcoming rules that are to go into effect at a future date, etc.

The systems described herein can also allow a customer to specify which department or individual is to receive what portion of a premium bill at a single location. For example, a large corporation may have a sprawling corporate headquarters that houses thousands of employees. The corporation may wish to have all of its insurance premiums delivered to the corporate headquarters, but with specific premium splits being directed to different departments and/or individuals that are located at the corporate headquarters. In such a situation, the present system can allow the customer to specify which portion of the premium goes to which individual or department, and a separate request can be made for each different coverage type purchased by the corporation.

In an illustrative embodiment, any of the operations described herein can be implemented at least in part as computer-readable instructions stored on a computer- readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:
1. A method comprising:
receiving, from a computing device of a customer, a first request that specifies first allocation of an insurance premium to a plurality of locations of the customer;
receiving, from the computing device of the customer, a second request that specifies a second allocation of the insurance premium to the plurality of locations of the customer, wherein the second request specifies a date range during which the second request is to be implemented;
generating, in response to the first request and the second request and by an invoice distribution server, a plurality of rules to implement the first request and the second request, wherein generating the plurality of rules comprises:
generating a first rule that assigns a location identifier to each of the plurality of locations;
generating a second rule that allocates a respective portion of the insurance premium to each location identifier;
generating a third rule that ensures that a sum of each portion of the insurance premium is equal to the insurance premium; and
storing the first rule, the second rule, and the third rule in a first database associated with the invoice distribution server;

receiving from at least the first database or a second database, by the invoice distribution server, an amount of the insurance premium;

retrieving from the first database, by the invoice distribution server, the plurality of rules;

executing, by the invoice distribution server, the plurality of rules to allocate the amount of the insurance premium to the plurality of locations of the customer in accordance with the first request and the second request, wherein the invoice distribution server automatically executes the plurality of rules based upon the second allocation in the second request during the date range specified in the second request and based upon the first allocation in the first request outside of the date range; and generating, by the invoice distribution server, a first plurality of invoices indicative of the allocation of the amount of the insurance premium in accordance with the plurality of rules.

2. The method of claim 1, further comprising sending the plurality of invoices to at least a portion of the plurality of locations.

3. The method of claim 1, wherein at least one of the first request and the second request comprises a percentage split request that specifies a percentage of the insurance premium to be allocated to each of the plurality of locations.

4. The method of claim 3, wherein the percentage split request is to divide the insurance premium equally among the plurality of locations.

5. The method of claim 3, wherein the percentage split request is to divide the insurance premium unequally among the plurality of locations.

6. The method of claim 1, wherein at least one of the first request and the second request comprises a coverage type request that specifies one of the plurality of locations that is to receive the insurance premium.

7. The method of claim 1, further comprising receiving, from the computing device of the customer, a start date specifying when to start implementing the request.

8. The method of claim 7, wherein the start date comprises a date on which the first request and the second request is received from the computing device.

9. The method of claim 7, wherein the start date comprises a future date on which the first request and the second request is to be implemented.

10. The method of claim 7, further comprising receiving, from the computing device of the customer, an end date specifying when to stop implementing the second request, wherein the start date and the end date of the second request form the date range during which the second request is to be implemented.

11. The method of claim 1, wherein at least one of the plurality of locations is allocated a zero percent portion of the insurance premium.

12. The method of claim 1, wherein one of the plurality of locations is allocated a one hundred percent portion of the insurance premium.

13. The method of claim 12, wherein the one of the plurality of locations is not covered by an insurance policy that is associated with the insurance premium.

14. The method of claim 1, wherein generating the second rule further comprises generating a fourth rule that multiplies a respective specified percentage of each location identifier with the insurance premium.

15. The method of claim 1, wherein retrieving the plurality of rules comprises retrieving the plurality of rules in response to receiving a subsequent request for generation of an invoice.

16. The method of claim 1, further comprising:

a pre-determined amount of after generating the first plurality of invoices, receiving, by the invoice distribution server, a second amount associated with the insurance premium;

in response to receiving the second amount, retrieving the plurality of rules from the first database by the invoice distribution server;

executing, by the invoice distribution server, the plurality of rules to allocate the second amount of the insurance premium to the plurality of locations of the customer in accordance with the request; and generating, by the invoice distribution server, a second plurality of invoices indicative of the allocation of the second amount of the insurance premium in accordance with the plurality of rules.

17. The method of claim 1, wherein executing the plurality of rules comprises retrieving, by the invoice distribution server, the plurality of rules from the first database each time the plurality of rules are executed.

18. A server comprising:

a memory configured to store a rules engine and information regarding a customer;

a transceiver configured to:

receive, from a computing device of the customer, a first request that specifies first allocation of an insurance premium of the customer to a plurality of locations of the customer;

receive, from the computing device of the customer, a second request that specifies a second allocation of the insurance premium to the plurality of locations of the customer, wherein the second request specifies a date range during which the second request is to be implemented;

receive an amount of the insurance premium from a first database;

retrieve a plurality of rules from at least the first database or a second database associated with the invoice distribution server; and a processor operatively coupled to the memory and to the transceiver, wherein the processor is configured to:

generate, in response to the first request and the second request, a plurality of rules in the rules engine to implement the first request and the second request, wherein the plurality of rules comprises:

a first rule that assigns a location identifier to each of the plurality of locations;

a second rule that allocates of each location identifier to a respective portion of the insurance premium; and a third rule that ensures that a sum of each of the portion of the insurance premium is equal to the insurance premium;

store the plurality of rules in at least the first database or a second database associated with the invoice distribution server;

retrieve the plurality of rules from at least the first database or the second database;

execute the plurality of rules to allocate the amount of the insurance premium to the plurality of locations of the customer in accordance with the request, wherein the processor is configured to automatically execute the plurality of rules based upon the second allocation in the second request during the date range specified in the second request and based upon the first allocation in the first request outside of the date range; and generate a plurality of invoices indicative of the allocation of the amount of the insurance premium.

19. The server of claim 18, wherein at least one of the first request and the second request comprises at least one of a percentage split request that specifies a percentage of the insurance premium to be allocated to each of the plurality of locations and a coverage type request that specifies one of the plurality of locations that is to receive the insurance premium.

20. The server of claim 18, wherein the transceiver is further configured to receive, from the computing device of the customer, a start date specifying when to start implementing the second request.

21. A non-transitory computer-readable medium having instructions stored thereon that, upon execution by a processor of a computing device, cause the computing device to perform operations, the instructions comprising:

instructions to receive, from a computing device of a customer, a first request that specifies first allocation of an insurance premium to a plurality of locations of the customer;

instructions to receive, from the computing device of the customer, a second request that specifies a second allocation of the insurance premium to the plurality of locations of the customer, wherein the second request specifies a date range during which the second request is to be implemented;

instructions to generate, in response to the first request and the second request, a plurality of rules to implement the first request and the second request, wherein the plurality rules comprises:

a first rule that assigns a location identifier to each of the plurality of locations;

a second rule that allocates each location identifier to a respective portion of the insurance premium; and a third rule that ensures that a sum of each portion of the insurance premium is equal to the insurance premium;

instructions to store the plurality of rules in a first database;

instructions to receive an amount of the insurance premium from at least the first database or a second database;

instructions retrieve the plurality of rules from the first database;

instructions to execute the plurality of rules to allocate the insurance premium to the plurality of locations of the customer in accordance with the request, wherein the instructions automatically execute the plurality of rules based upon the second allocation in the second request during the date range specified in the second request and based upon the first allocation in the first request outside of the date range; and instructions to generate a plurality of invoices indicative of the allocation of the amount of the insurance premium.

\* \* \* \* \*